United States Patent [19]

Taylor et al.

[11] 4,212,910

[45] Jul. 15, 1980

[54] PET BOTTLE ASSEMBLIES PRODUCED BY USING A HOT MELT ADHESIVE COMPRISING A BLOCK COPOLYMER AND A TACKIFYING RESIN

[75] Inventors: Thomas R. Taylor, South Somerville; Paul P. Puletti, Glen Gardner, both of N.J.

[73] Assignee: National Starch & Chemical Corporation, Bridgewater, N.J.

[21] Appl. No.: 34,100

[22] Filed: Apr. 30, 1979

[51] Int. Cl.$^2$ .................. B65D 11/04; B65D 11/22; C09J 3/14; C09J 5/00

[52] U.S. Cl. .................................... 428/35; 156/228; 156/334; 206/813; 215/1 C; 425/522

[58] Field of Search .................... 428/35; 150/0.5; 156/228, 334; 215/1 C; 206/813

[56] References Cited

U.S. PATENT DOCUMENTS

| | | | |
|---|---|---|---|
| 3,427,269 | 2/1969 | Davis et al. | 156/334 |
| 3,722,725 | 3/1973 | Khetani et al. | 215/1 C |
| 3,726,429 | 4/1973 | Doughty | 215/1 C |
| 3,728,193 | 4/1973 | McKeever et al. | 156/334 |
| 3,837,994 | 9/1974 | Flanagan et al. | 281/21 R |
| 3,865,302 | 2/1975 | Kane | 156/334 |
| 3,902,617 | 9/1975 | Valgi | 215/1 C |
| 3,932,330 | 1/1976 | Lakshmanan | 156/334 |
| 4,082,200 | 4/1978 | Guest et al. | 215/1 C |
| 4,136,699 | 1/1979 | Collins et al. | 428/40 |

*Primary Examiner*—James C. Cannon
*Attorney, Agent, or Firm*—Edwin Szala; Ellen T. Dec

[57] ABSTRACT

PET bottle assemblies are prepared from a PET bottle which has been blow-molded and joined to a HDPE base cup with a hot melt adhesive which consists essentially of a blend of: (1) a block copolymer selected from the class consisting of: (a) A-B-A block copolymer where A is a monovinyl aromatic hydrocarbon and B is either a conjugated diene or a rubbery mono-olefin and (b) a teleblock copolymer comprising molecules having at least three branches radially branching out from a central hub, each said branch having polystyrene terminal blocks and a butadiene segment in the center; (2) at least one tackifying resin which serves to extend the adhesive properties of the system; (3) at least one stabilizer; and (4) at least one wax or oil diluent.

The resultant assemblies are characterized by bonds or joints which possess an unusual combination of excellent low and high temperature adhesion and flexibility as well as high bond strengths.

11 Claims, No Drawings

PET BOTTLE ASSEMBLIES PRODUCED BY USING A HOT MELT ADHESIVE COMPRISING A BLOCK COPOLYMER AND A TACKIFYING RESIN

I. FIELD OF THE INVENTION

This invention relates to a multipart polyester terephthalate (PET) bottle assembly wherein a polyethylene base cup is joined to a blow-molded PET bottle with one of a specific class of hot melt adhesives.

II. DESCRIPTION OF THE PRIOR ART

Polyester bottles are rapidly replacing glass bottles in many industrial applications and particularly in the soft-drink industry. Generally these bottles are produced by blow-molding a test-tube shaped preform so as to produce a bottle having a rounded bottom which requires a separate base cup in order to stand upright and also to give it sufficient integrity to withstand bottling, handling and storage conditions. The base cup is usually produced from a high density polyethylene (HDPE) and is often joined to the bottle with a hot melt adhesive.

The demands put on the adhesive bond in this application are diverse and substantial. As an example, stresses on the bond often cause the base cup and bottle assemblies to be split or separated during transit of the empty bottles and then they cannot be used on the automated filling lines. When the bottle is filled, sufficient pressure is exerted by the contents to give a better mechanical fit between the base cup and bottle, thereby keeping the base cup joined to the bottle. However, once the bottle is partially emptied during use by the consumer, the mechanical fit no longer contributes to the joined area and the role of the adhesive is again critical since separation of bottle and base cup, particularly if the consumer is holding only the base cup, can present a major problem. It will be further recognized that the bottle assembly will be exposed to a variety of temperature and humidity conditions prior to and after filling, which conditions will also contribute to the stresses placed on the adhesive used therein.

In order to insure that the PET bottle assemblies possess sufficient strength and integrity to withstand these stresses, many of the soft drink bottlers have imposed a series of stringent specifications which the assemblies must meet. Thus, in the case of at least one bottler, the assemblies are subjected to a series of tests in which, among other criteria, they are chilled to 0° F. and dropped (empty) a distance of 6 feet; chilled to 40° F. and dropped (full) a distance of 6 feet. To date, none of the ethylene-vinyl acetate based hot melt adhesives marketed to the industry have been able to produce PET bottle assemblies which consistently meet all these specifications.

It is therefore an object of the present invention to provide a PET bottle assembly wherein the bond between the bottle and base cup is sufficient to withstand the stresses to which the assembly is exposed and to conform with the specifications demanded by the industry.

SUMMARY OF THE INVENTION

We have now found that a specific class of hot melt adhesives based on specific block copolymers, when used to bond PET bottles to the HDPE base cups, will produce PET bottle assemblies with sufficient strength and integrity to conform to the rigid specifications set by the bottling industry.

Thus, the present invention is directed to PET bottle assemblies comprising a PET bottle which has been blow-molded and joined to a HDPE base cup with a hot melt adhesive which consists essentially of a blend of: (1) a block copolymer selected from the class consisting of: (a) an A-B-A block copolymer where A is a monovinyl aromatic hydrocarbon and B is either a conjugated diene or a rubbery mono-olefin and (b) a teleblock copolymer comprising molecules having at least three branches radially branching out from a central hub, each said branch having polystyrene terminal blocks and a butadiene segment in the center; (2) at least one tackifying resin which serves to extend the adhesive properties of the system; (3) at least one stabilizer; and (4) at least one wax or oil diluent.

The resultant assemblies are characterized by bonds or joints which possess an unusual combination of excellent low and high temperature adhesion and flexibility as well as high bond strengths.

DETAILED DESCRIPTION OF THE PREFERRED EMBODIMENTS

The basic polymer component of the hot melt adhesive used herein may be described as one of two specific classes: an unvulcanized elastomeric block polymer wherein the respective monomeric moieties are arranged in an alternating sequence having the general configuration A-B-A wherein A is a non-elastomeric block derived from the moieties of a monovinyl aromatic hydrocarbon monomer and B is an elastomeric polymer block derived from the moieties of either a conjugated diene monomer or a mono-olefin, the total concentration of the A block therein ranging from about 10 to 50% as based on the total weight of the polymer. It should be noted that, in these polymers, styrene is ordinarily used as the monovinyl aromatic hydrocarbon member. Butadiene-1,3 and isoprene are the most frequently used conjugated diene members. Thus, for example, styrene-butadiene-styrene polymers are commercially available from Shell Chemical Co. under the trademarks "Kraton 1101" and "Kraton 1102" while styrene-isoprene-styrene polymers are available under the trademarks "Kraton 107" and "Kraton 84-0554." The mono-olefin is generally a ethylenebutylene monomer, although other monomeric components could be used. Suitable styrene-ethylenebutylene-styrene copolymers for use herein are available commercially from Shell Chemical Co. under the tradename "Kraton G."

(b) A teleblock copolymer comprising molecules having at least three branches radially branching out from a central hub, each said branch having polystyrene terminal blocks and a butadiene segment in the center. This type of block copolymer may also be described as having a branched polymerized butadiene mid-block with a polystyrene terminal block at the end of each branch. The number of butadiene units should, in all cases, be greater than the number of styrene units. Typical teleblock copolymers are available commercially from Phillips Petroleum Company under the SOLPRENE trademark.

It will also be recognized that mixtures of any of the above block copolymers may also be used as base components in the adhesives employed in the PET bottle assemblies of the present invention.

The tackifying resins which are present in the hot melt adhesive used herein serve to extend the adhesive properties of the block polymer. As contemplated, the term "tackifying resin" includes: (1) natural and modified rosins such, for example, as gum rosin, wood rosin, tall-oil rosin, distilled rosin, hydrogenated rosin, dimerized rosin, and polymerized rosin; (2) glycerol and pentaerythritol esters of natural and modified rosins, such, for example, as the glycerol ester of pale wood rosin, the glycerol ester of hydrogenated rosin, the glycerol ester of polymerized rosin, the pentaerythritol ester of hydrogenated rosin, and the phenolic modified pentaerythritol ester of rosin; (3) polyterpene resins having a softening point, as determined by ASTM method E28 58T, of from about 60° to 140° C., the latter polyterpene resins generally resulting from the polymerization of terpene hydrocarbons, such as the bicyclic mono-terpene known as pinene in the presence of Friedel-Crafts catalysts at moderately low temperatures; (4) phenolic-modified terpene resins such, for example, as the resin product resulting from the condensation in an acidic medium, of a bicyclic terpene and a phenol; and (5) aliphatic petroleum hydrocarbon resins having a Ball and Ring softening point of from about 60° to 140° C., the latter resins resulting from the polymerization of monomers consisting primarily of olefins and diolefins.

The stabilizers which are present in the hot melt adhesive used herein serve to protect the otherwise vulnerable block polymer, and thereby the total adhesive system, from the thermal and oxidative degradation which is frequently encountered during the manufacture and application of the adhesive as well as in the ordinary exposure of the final adhered product. Such degradation is usually manifested by deterioration in appearance, physical properties and performance. Among the applicable stabilizers are included high molecular weight hindered phenols and multifunctional phenols such as sulfur and phosphorous-containing phenols. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxy group. The presence of these sterically bulky substituted radicals in the vicinity of the hydroxyl group serves to retard its stretching frequency and correspondingly, its reactivity, this steric hindrance thus providing the phenolic compound with its stabilizing properties. Representative hindered phenols include: 1,3,5-trimethyl-2,4,6-tris(3,5-di-tert-butyl-4-hydroxybenzyl)benzene; pentaerythrityl tetrakis-3(3,5-di-tert-butyl-4-hydroxyphenyl)-propionate; n-octadecyl-3(3,5-di-tert-butyl-4-hydroxyphenyl)propionate; 4,4'-methylenebis (2,6-di-tert-butyl phenol); 2,2'-methylenebis (4-methyl-6-tert-butylphenol); 4,4'-thiobis(6-tert-butyl-o-cresol); 2,6-di-tert-butylphenol; 6-(4-hydroxyphenoxy)-2,4-bis (n-octylthio)-1,3,5-triazine; 2,4,6-tris(4-hydroxy-3,5-di-tert-butylphenoxy)-1,3,5-triazine; di-n-octadecyl-3,5-di-tert-butyl-4-hydroxy-benzylphosphonate; 2-(n-octylthio)ethyl-3,5-di-tert-butyl-4-hydroxy-benzoate; and sorbitol hexa-[3-(3,5-di-tert-butyl-4-hydroxy-phenyl) propionate].

The performance of these stabilizers may be further enhanced by utilizing, in conjunction therewith: (1) synergists such, for example, as thiodipropionate esters and phosphites; and (2) chelating agents and metal deactivators such, for example, as ethylenediamine tetraacetic acid, salts thereof, and disalicylalpropylenediimine Wax or oil diluents are employed in order to reduce the melt viscosity or cohesive characteristics of the hot melt adhesive compositions without appreciable decreasing their adhesive binding characteristics. Among the applicable wax diluents are included: (1) low molecular weight, e.g. 1000-6000, polyethylene having a hardness value, as determined by ASTM method D-1321, of from about 0.1 to 120 and an ASTM softening point of from about 150°-250° F.; (2) petroleum waxes such as paraffin wax having a melting point of from about 130° to 175° F. and microcrystalline wax having a melting point of from about 135° to 200° F.; the latter melting points being determined by ASTM method D127-60; (3) atactic polypropylene having a Ball and Ring softening point of from about 120° to 160° C.; and (4) synthetic waxes made by polymerizing carbon monoxide and hydrogen such as Fischer-Tropsch wax. Each of these wax diluents is solid at room temperatures. Hydrogenated animal, fish and vegetable fats and oils such as hydrogenated tallow, lard, soya oil, cottonseed oil, castor oil, menhadin oil, cod liver oil, etc., are solid materials at ambient temperature by virtue of their being hydrogenated and are also found to be useful to function as the wax diluent equivalent. These hydrogenated materials are often referred to in the adhesive industry as "animal or vegetable waxes." Additionally hydrocarbon oils, especially naphthenic or paraffinic process oils, may also be employed herein as the diluent.

With regard to proportions, the hot melt adhesive used herein typically contains a concentration of the block polymer ranging from about 20 to 40%, a concentration of tackifying resin ranging from about 30 to 59%, a concentration of stabilizer ranging from about 0.2 to 4% and a concentration of wax or oil diluent ranging from about 10 to 40%, said concentrations being based on a 100% solids total weight of the hot melt composition.

These hot melt adhesive compositions may be formulated using techniques known in the art. An exemplary procedure involves placing approximately half of the total tackifying resin concentration in a jacketed mixing kettle, preferably in a jacketed heavy duty mixer of the Baker-Perkins or Day type, which is equipped with rotors and thereupon raising the temperature to a range of from about 250° to 350° F., the precise temperature utilized depending on the melting point of the particular tackifying resin. When the resin has melted, stirring is initiated and the block polymer and stabilizer are added together with any optional additives whose presence may be desired, the addition of the latter components being extended over a prolonged period in order to avoid the formation of lumps. Mixing and heating are continued until a smooth, homogeneous mass is obtained whereupon the remainder of the tackifying resin and the wax diluent are thoroughly and uniformly admixed therewith.

The resultant hot melt adhesives are produced either in bulk or slat form depending upon the specific components employed. Thus, adhesives prepared with an oil type diluent, e.g. mineral oil, will be produced in bulk form and will be ordinarily packaged in release coated tubs or boxes. The preferred adhesives are those prepared with wax diluents which will be dry to the touch and can be slatted or otherwise shaped and hence more readily packaged, handled and employed.

The viscosity of the hot melt adhesives at application temperature (300°–400° F.) is generally in the range of about 1000 to 8000 cps., with ranges of 3000 to 4000 cps. preferred.

Optional additives may be incorporated into the hot melt compositions in order to modify certain properties thereof. Among these additives may be included: colorants such as titanium dioxide; and fillers such as talc and clay, etc.

In order to produce the PET bottle assemblies of the present invention, the bottles and base cups are typically fed onto straight-line or centrifugal feeder units, the hot melt adhesive applied in dots through a multiple orifice nozzle at a coating weight of approximately 0.4 to 0.75 gms. per base cup, and then the bottle and base cup are clamped together for a minimum of about 6.5 seconds to assure straight assembly and proper set-up of the hot melt adhesive. The assemblies are then generally labeled and packaged into palletized loads for shipment to the bottling operation.

The following examples will further illustrate the embodiments of the invention. In these examples all parts given are by weight and all temperatures in degrees Celsius unless otherwise indicated.

EXAMPLE I

This example illustrates the preparation of a slattable hot melt adhesive suitable for use in the PET bottle assemblies of the present invention.

A heavy duty mixer which had been heated to 150° C. and which was equipped with a stirring paddle was charged with 21.5 parts of a glycerol ester of rosin. After melting of the rosin, stirring was then initiated whereupon 32 parts of a styrene-butadiene-styrene block polymer commercially available from Shell Chemical Co., under the trademark "Kraton 1102," and a stabilizer system consisting of 1 part tris(mono and dinonyl phenyl)phosphite, 0.2 parts tetrakis[methylene (3',5'-di-tertbutyl-4-hydroxy phenyl)propionate]methane and 0.6 parts distearyl-thiodipropionate were added slowly. Heating and stirring were continued until a homogeneous mass was obtained whereupon 21.5 additional parts of the rosin ester and 25 parts paraffin wax (m.p. 150°–155° F.) were admixed therewith. The molten mixture was then extruded onto a moving cooling belt and, upon solidification, cut to form slats.

The resulting homogeneous hot melt composition had a melt viscosity of about 4500 cps. at 175° C. as determined by a Brookfield RVT equipped with a Brookfield Thermosel (Spindle #27, 20 rpm).

EXAMPLE II

A pressure sensitive (bulk form) hot melt adhesive useful in the PET bottle assemblies of the present invention was prepared with the following components using the procedure of Example I.

| | Parts |
|---|---|
| Kraton 1102 | 25.0 |
| glycerol ester of hydrogenated rosin | 56.0 |
| Mineral oil | 19.0 |
| Stabilizer system of Example I | 1.8 |

The hot melt adhesive compositions produced in Examples I and II were used to produce PET bottle assemblies using conventional manufacturing equipment. The bottle assemblies were subjected to a variety of testing procedures as demanded by the industry. Additionally, each adhesive was then observed to determine the degree of gelling or the formation of skin or char, the presence of which would indicate poor heat (i.e. pot) stability and would lead to difficulties in machining due to clogging of the nozzles.

For comparative purposes, similar tests were prepared using adhesive compositions and/or PET bottle assemblies prepared therewith, wherein the adhesive was one of four ethylene-vinyl acetate based hot melt adhesive compositions currently being marketed for the production of PET bottle assemblies.

| | Adhesive Formulation | | | | | |
|---|---|---|---|---|---|---|
| | | | Competitive | | | |
| Test | Ex. I | Ex. II | A | B | C | D |
| Heat Stability | | | | | | |
| Skin | None | None | Yes | Slight | Yes | Yes |
| Gel | None | None | Slight | | Yes | Yes |
| Char | None | None | | | Yes | |
| Drop Test (from 6 feet) | | | | | | |
| Room temp. (full) | pass | pass | pass | fail | pass | pass |
| 40° F. (full) | pass | pass | partial failure | fail | partial failure | partial failure |
| 0° F. (empty) | pass | pass | fail | fail | fail | fail |

As can be seen from the above testing data, only those bottle assemblies prepared according to the present invention consistently met the specifications required by the industry.

EXAMPLE IV

In a similar manner other hot melt adhesives useful herein may be prepared using the following formulations.

| | Formulations | | | |
|---|---|---|---|---|
| Ingredient | A | B | C | D |
| Kraton 1102 | 27.5 | 30.0 | — | — |
| Kraton G 1650 | — | — | 25.00 | — |
| Solprene 416 | — | — | — | 35.00 |
| Glycerol ester of hydrogenated rosin | — | — | 50.00 | — |
| Pentaerythritol ester of hydrogenated rosin | 36.0 | — | — | 35.0 |
| Glycerol ester of rosin | — | 43.0 | — | — |
| Diethylene glycol abietate rosin ester | — | 5.0 | — | — |
| Aromatic $C_9$ hydrocarbon tackifying resin | 18.0 | — | — | — |
| Mineral oil | 18.5 | — | — | — |
| Paraffin (m.p. 140°–145° F.) | — | — | — | 30.0 |
| Paraffin (m.p. 150°–155° F.) | — | — | 25.0 | — |
| Stabilizer system of Ex. I | 1.8 | 1.8 | — | 1.8 |
| Tetrakis [methylene(3',5'-di-tert-butyl-4-hydroxy phenyl)propionate] methane | — | — | 0.3 | — |

Variations may be made in proportions, procedures and materials without departing from the scope of the invention as defined by the following claims.

We claim:

1. A PET bottle assembly comprising a PET bottle which has been blow-molded and joined to a HDPE base cup with a hot melt adhesive which consists essentially of a blend of: (1) a block copolymer selected from the class consisting of: (a) an A-B-A block copolymer where A is a monovinyl aromatic hydrocarbon and B is either a conjugated diene or a rubbery mono-olefin and (b) a teleblock copolymer comprising molecules having at least three branches radially branching out from a central hub, each said branch having polystyrene terminal blocks and a butadiene segment in the center; (2) at least one tackifying resin which serves to extend the adhesive properties of the system; (3) at least one stabilizer; and (4) at least one wax or oil diluent.

2. The PET bottle assembly of claim 1 wherein the hot melt adhesive is prepared in slat form using a wax diluent.

3. The PET bottle assembly of claim 2 wherein the wax diluent is selected from the group consisting of low molecular weight polyethylene having a hardness value of 0.1 to 120 and an ASTM softening point of 150°–250° F., petroleum waxes having a melting point of 130°–175° F., microcrystalline wax having a melting point of 135°–200° F., atactic polypropylene having a Ball and Ring softening point of 120°–160° C., synthetic waxes made by polymerizing carbon monoxide and hydrogen and hydrogenated animal, fish and vegetable fats and oils.

4. The PET bottle assembly of claim 1 wherein the hot melt adhesive is prepared in bulk form using an oil diluent.

5. The PET bottle assembly of claim 4 wherein the oil diluent is a naphthenic or paraffinic process oil.

6. The PET bottle assembly of claim 2 or 4 wherein the block copolymer is a styrene-butadiene-styrene block copolymer.

7. The PET bottle assembly of claim 2 or 4 wherein the block copolymer is a styrene-isoprene-styrene block copolymer.

8. The PET bottle assembly of claim 2 or 4 wherein the block copolymer is a styrene-ethylenebutylene-styrene block copolymer.

9. The PET bottle assembly of claim 2 or 4 wherein the tackifying resin is selected from the group consisting of natural and modified rosin, glycerol and pentaerythritol esters of natural and modified rosin, polyterpene resins having a softening point of 60° to 140° C., phenolic-modified terpene resins, and aliphatic petroleum hydrocarbon resins having a Ball and Ring softening point of 60°–140° C.

10. The PET bottle assembly of claim 2 or 4 wherein the stabilizer is a high molecular weight hindered phenol or a multifunctional phenol.

11. The PET bottle assembly of claim 2 or 4 wherein the hot melt adhesive contains a concentration of the block polymer ranging from about 20 to 40%, a concentration of tackifying resin ranging from 30 to 59%, a concentration of stabilizer ranging from about 0.2 to 4% and a concentration of wax or oil diluent ranging from about 10 to 40%, said concentrations being based on a 100% solids total weight of the hot melt composition.

* * * * *